UNITED STATES PATENT OFFICE.

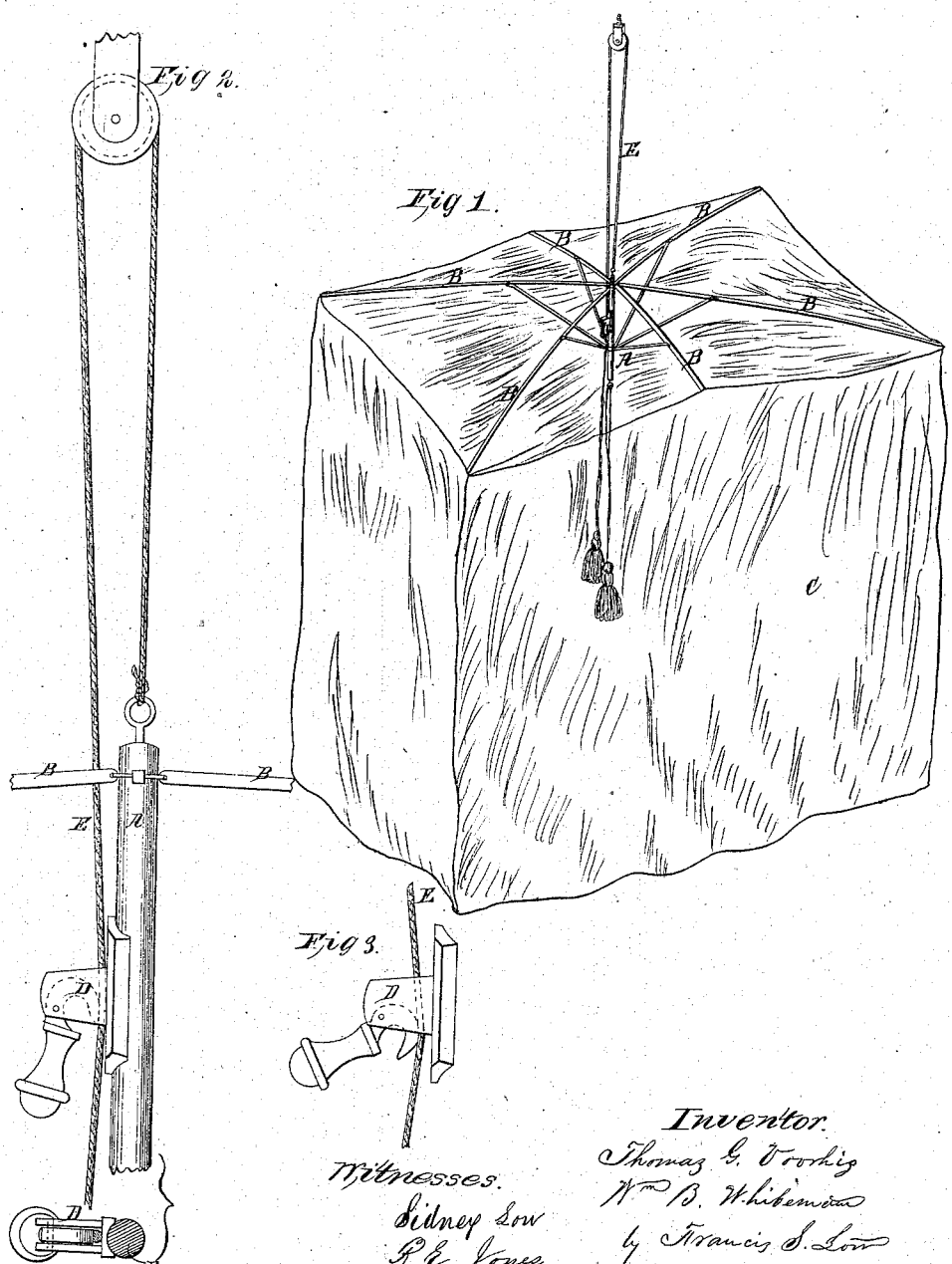

THOS. G. VOORHIS AND WM. B. WHITEMAN, OF NEW YORK, N. Y.

MOSQUITO-NET.

Specification of Letters Patent No. 32,018, dated April 9, 1861.

*To all whom it may concern:*

Be it known that we, THOMAS G. VOORHIS and WILLIAM B. WHITEMAN, both of the city, county, and State of New York, have invented certain new and and useful Improvements in Mosquito Nets or Bars; and we do hereby declare that the following is a full and exact description of the same, reference being had to the accompanying drawings, and to the letters of reference marked thereon, in which—

Figure 1 is a perspective view of the net complete, and Figs. 2 and 3 detached views of the cam catch which retains the net in position.

Our invention relates to an arrangement of means by which the net can be spread out for use, or be rendered portable and folded together to occupy a limited amount of room; and to an arrangement by which the net can be readily raised or lowered and secured in position—the first consisting of a series of folding rods or sticks jointed to a center rod, (similar to the ordinary umbrella frame) which support, and spread the top of the net when they are hoisted or opened, and allow the net to be folded and compressed into a small space when they are lowered or closed; and the last, of a cam-catch attached to the center rod of the frame, through which the suspending cord of the net is returned, and by which the net can be readily raised or lowered to proper height above the bed and be securely retained in place.

A is the center rod of the frame, to which the ribs or sticks B (six in number) are jointed similar to the ordinary umbrella frame. The two side ribs or sticks are made shorter than the end ones, to make the top of the net conform to the shape of the bed to which it is attached. The ribs are connected by stretchers to a slide on the center rod which is supported and held up, when the frame is opened, by a spring catch, the same as is employed in umbrellas. The ends of the ribs are connected together by cords, or are secured to the netting to hold out the netting when the frame is opened.

C is the netting secured at its upper part to the ends of the ribs B (or to the cords connecting the ribs together) to keep it in place.

D is a cam-catch, attached to the side of the center rod A, and between which and the rod A the suspending cord E is returned by which the net is raised or lowered and retained in position. To raise the net the suspending cord E is pulled downward, releasing thereby the catch from contact with the cord (as shown in Fig. 3) and allowing the net to be raised to any desired position— the releasing of the cord bringing the catch in contact with the rod A to grasp and hold the suspending cord securely. To lower the net the suspending cord is drawn to one side, drawing the catch from contact with the center rod (as shown in Fig. 3) and allowing the cord to pass it and the net to be lowered to any desired position.

What we claim as our invention and desire to secure by Letters Patent is—

The combination of the cam-catch D with the jointed frame and netting as described and for the purpose set forth.

THOS. G. VOORHIS.
W. B. WHITEMAN.

Witnesses:
FRANCIS S. LOW,
HENRY J. WOOD.